United States Patent [19]
Loehr

[11] Patent Number: 6,076,342
[45] Date of Patent: Jun. 20, 2000

[54] MECHANISM FOR ADJUSTING THE HEIGHT OF A CUTTING MECHANISM IN AN AGRICULTURAL HARVESTER

[75] Inventor: Thomas J. Loehr, Mt. Calvary, Wis.

[73] Assignee: Gehl Company, West Bend, Wis.

[21] Appl. No.: 09/017,357

[22] Filed: Feb. 2, 1998

[51] Int. Cl.$^7$ ..................................................... A01D 67/00
[52] U.S. Cl. ............................................................. 56/208
[58] Field of Search .......................... 56/1, 10.2 K, 15.2, 56/15.8, 15.9, 17.1, 17.2, 208, 209, DIG. 1, DIG. 15

[56] References Cited

U.S. PATENT DOCUMENTS

| | | | |
|---|---|---|---|
| 4,180,966 | 1/1980 | Zen | 56/208 |
| 4,206,582 | 6/1980 | Molzahn et al. | 56/15.8 |
| 4,266,392 | 5/1981 | Knepper et al. | 56/14.5 |
| 4,473,993 | 10/1984 | Jennings et al. | 56/208 |
| 5,090,184 | 2/1992 | Garter et al. | 56/10.2 R |
| 5,157,905 | 10/1992 | Talbot et al. | 56/15.9 |
| 5,633,452 | 5/1997 | Bebernes | 56/208 X |

*Primary Examiner*—Robert E. Pezzuto
*Attorney, Agent, or Firm*—Andrus, Sceales, Starke & Sawall

[57] ABSTRACT

An agricultural harvesting machine includes a frame section carrying a pair of ground-engaging wheels and a header section carrying a crop cutting mechanism and pivotably mounted to the frame section. An adjustable link arrangement is interposed between the frame section and the header section, for controlling the angular relationship of the header section relative to the frame section to vary the elevation of the cutting mechanism carried by the header section. The adjustable link arrangement includes a rear link connected to the frame section and a front link pivotably connected to the rear link. An adjustment assembly is interconnected with the front link at a location spaced from the connection of the front link to the rear link, and the adjustment assembly is interconnected with the header section. The front link includes a threaded receiver, and the adjustment assembly includes a threaded shaft engageable with the threaded receiver, such that turning the threaded shaft results in adjustment of the axial position of the header section relative to the front link, and thereby relative to the frame section through the rear link. The threaded shaft is interconnected with a handle assembly for facilitating rotation of the threaded shaft by a user. Guide structure is mounted to a frame member associated with the header section, and includes a pair of guide slots which receive end portions of a pivot pin which interconnects the front and rear link members. The handle assembly includes a shoulder engageable with the guide structure, such that engagement of the guide structure with the shoulder controls the position of the header section relative to the front link member, and thereby relative to the frame section.

29 Claims, 5 Drawing Sheets

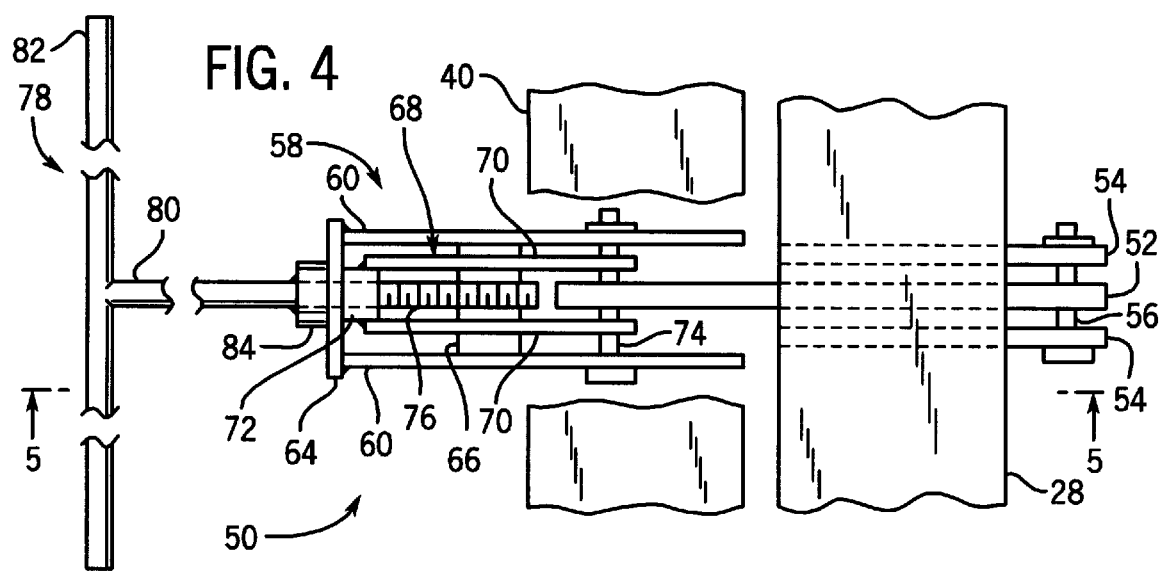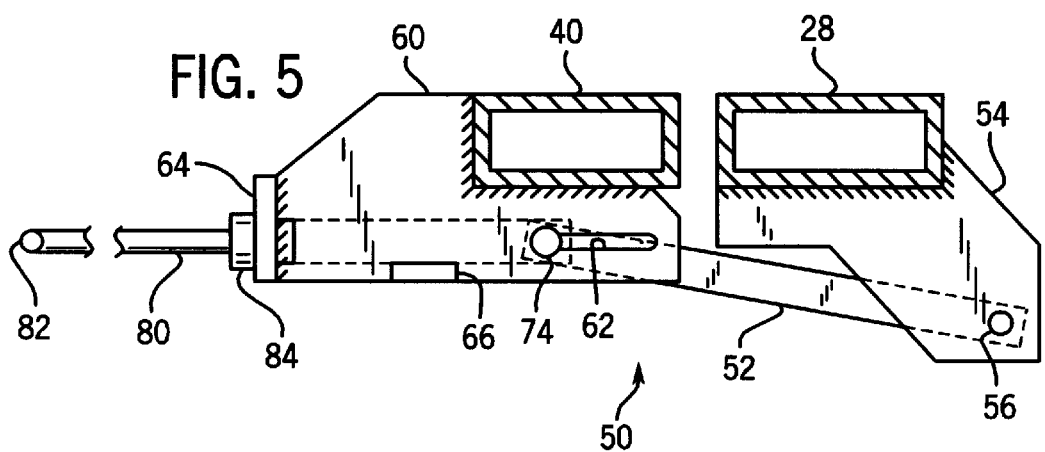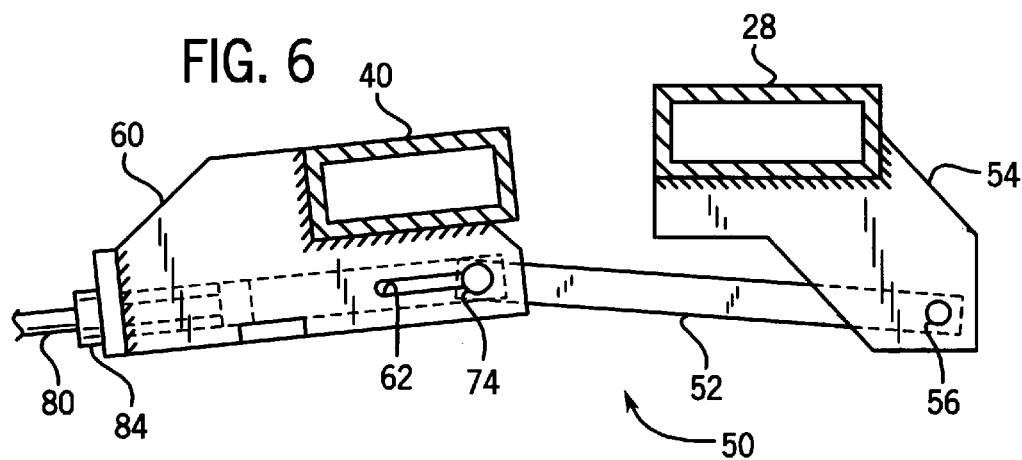

MECHANISM FOR ADJUSTING THE HEIGHT OF A CUTTING MECHANISM IN AN AGRICULTURAL HARVESTER

BACKGROUND AND SUMMARY OF THE INVENTION

This invention relates to an agricultural machine such as a mower conditioner, and more particularly to a mechanism for adjusting the elevation of a cutting mechanism forming a part of a mower conditioner.

An agricultural harvester such as a mower conditioner typically includes a frame or trailer carrying a pair of ground-engaging wheels, and a header pivotably mounted to the frame. The header carries a crop cutting mechanism, such as a sickle bar cutting mechanism or a disc-type cutterbar, and conditioning rolls are typically mounted to the header rearwardly of the cutting mechanism for conditioning crop material cut by the cutting mechanism. The header is typically mounted to the frame for pivoting movement about a horizontal pivot axis, located generally toward the lower extent of the machine. The header is also connected to the frame at a location above the pivot axis. In the past, it has been known to interconnect the header with the frame utilizing a turnbuckle-type arrangement. With an arrangement such as this, the distance between the header and the frame can be adjusted above the pivot axis, so as to adjust the angle of the header relative to the frame which results in adjustment of the elevation of the cutting mechanism relative to the ground. While this arrangement generally functions satisfactorily, the turnbuckle arrangement requires use of a wrench to adjust the spacing between the header and the frame, and the adjustment process is relatively time consuming.

It is an object of the present invention to provide a height adjustment mechanism for the cutting mechanism of an agricultural harvester, which is user friendly and which provides quick and easy adjustment in the height of the cutting mechanism. Another object of the invention is to provide such a height adjustment mechanism which is relatively simple in its components and assembly, thus requiring little if any additional manufacturing costs. Yet another object of the invention is to provide such a height adjustment mechanism which functions in a similar manner to prior art mechanisms yet which is easy to use and provides accurate height adjustment which is readily visible by an operator.

The invention is adapted for use in combination with an agricultural harvester having two sections which are pivotably interconnected for movement about a substantially horizontal pivot axis. One of the sections is in the form of a frame to which a pair of groundengaging wheels are mounted, and the other of the sections is in the form of a header which carries a crop cutting mechanism and which is mounted for pivoting movement to the frame about a header pivot axis. In accordance with the invention, a link arrangement is interposed between the header and the frame at a location spaced from the header pivot axis, so as to adjust the position of the header by varying the angle of the header relative to the frame. The link arrangement includes a pair of link members connected to each other. A first one of the link members is mounted to the header and a second one of the link members is mounted to the header and to the frame. In a preferred form, the second link member is pivotably mounted to the frame, and the first and second link members are pivotably interconnected with each other, such as by means of a pivot pin to which each of the link members are pivotably mounted. An adjustment member is interposed between the header and the first link member, for varying the position of the header relative to the link arrangement to thereby adjust the position of the header relative to the frame. In a preferred form, the adjustment member is in the form of a threaded shaft engaged with the header and threadedly engaged with the second link member. The second link member may be in the form of a clevis, including a pair of side members and an end member defining a threaded passage which receives the threaded shaft. Guide structure is provided for guiding movement of the header relative to the link arrangement. In a preferred form, the guide structure consists of a pair of spaced guide plates, each of which has a guide slot formed therein. The pivot pin, which interconnects the first and second link members, is received within the guide slots, and the slots define spaced ends which engage the pivot pin to limit the range of movement of the header relative to the frame. The guide members are preferably mounted to the header. A handle arrangement is preferably interconnected with the threaded shaft, for engagement by a user to enable the threaded shaft to be turned. The handle arrangement includes an axial portion extending from the threaded shaft, in combination with a transverse portion engageable by a user to turn the axial portion and to thereby rotate the threaded shaft. The header preferably includes a hood movable between an open position and a closed position. In its open position, the hood provides access to the handle to enable a user to grasp the handle transverse portion and to rotate the threaded shaft to vary the elevation of the cutting mechanism. When the hood is open and the user is in a position so as to turn the handle, the user can readily view the cutting mechanism so as to ensure that the cutting mechanism is positioned at a desired elevation relative to the ground. When the hood is in its closed position, the hood overlies the handle transverse portion so as to prevent the handle from turning and to thereby ensure that the cutting mechanism remains at the desired elevation.

The invention also contemplates an improvement in an agricultural harvester, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4 is a top plan view, with portions broken away, illustrating the assembled components of the height adjustment mechanism;

FIG. 5 is a partial section view taken along line 5—5 of FIG. 4, showing the height adjustment mechanism positioned so as to place the cutting mechanism in a fully raised position;

FIG. 6 is a view similar to FIG. 5 showing the height adjustment mechanism positioned so as to place the cutting mechanism in a fully lowered position;

DETAILED DESCRIPTION OF THE INVENTION

Figure 1:
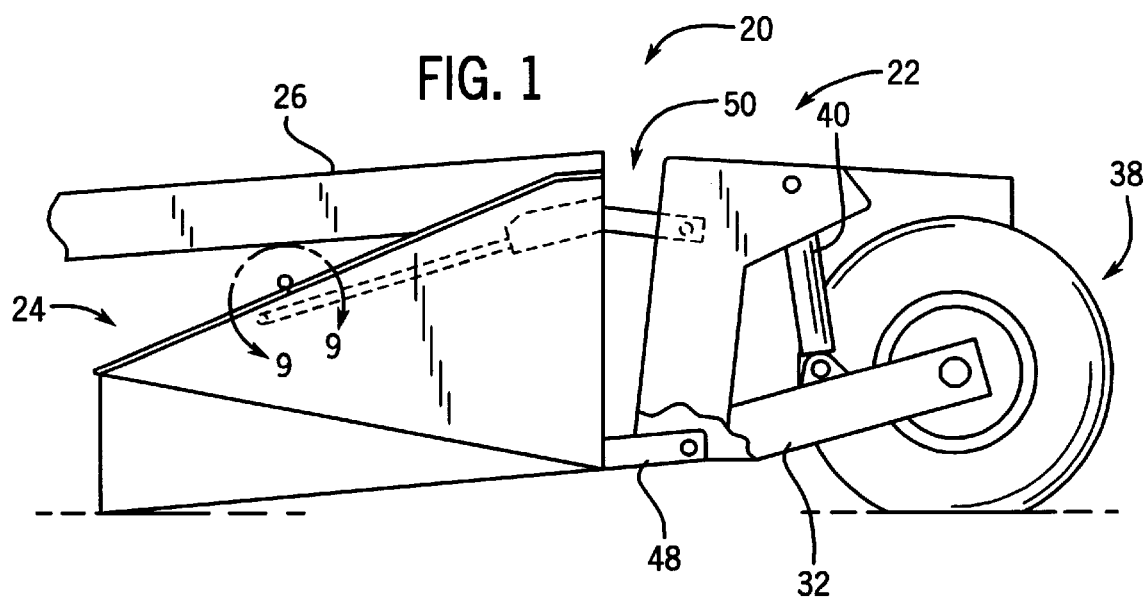
FIG. 1 is a partial side elevation view of an agricultural harvesting machine incorporating the height adjustment mechanism of the invention for controlling the height of the cutting mechanism.

FIG. 1 illustrates an agricultural harvesting machine in the form of a mower conditioner 20, for use in cutting agricultural crop material. Mower conditioner 20 generally includes a frame or trailer section 22 and a cutting or header section 24. A tongue 26 is interconnected with frame section 22, and is adapted for connection to a tractor for pulling mower conditioner 20 behind the tractor, in a manner as is known. A driveline (not shown) is carried by tongue 26, for transferring rotary power from the power take off of the tractor to mower conditioner 20, again in a manner as is known.

Figure 2:
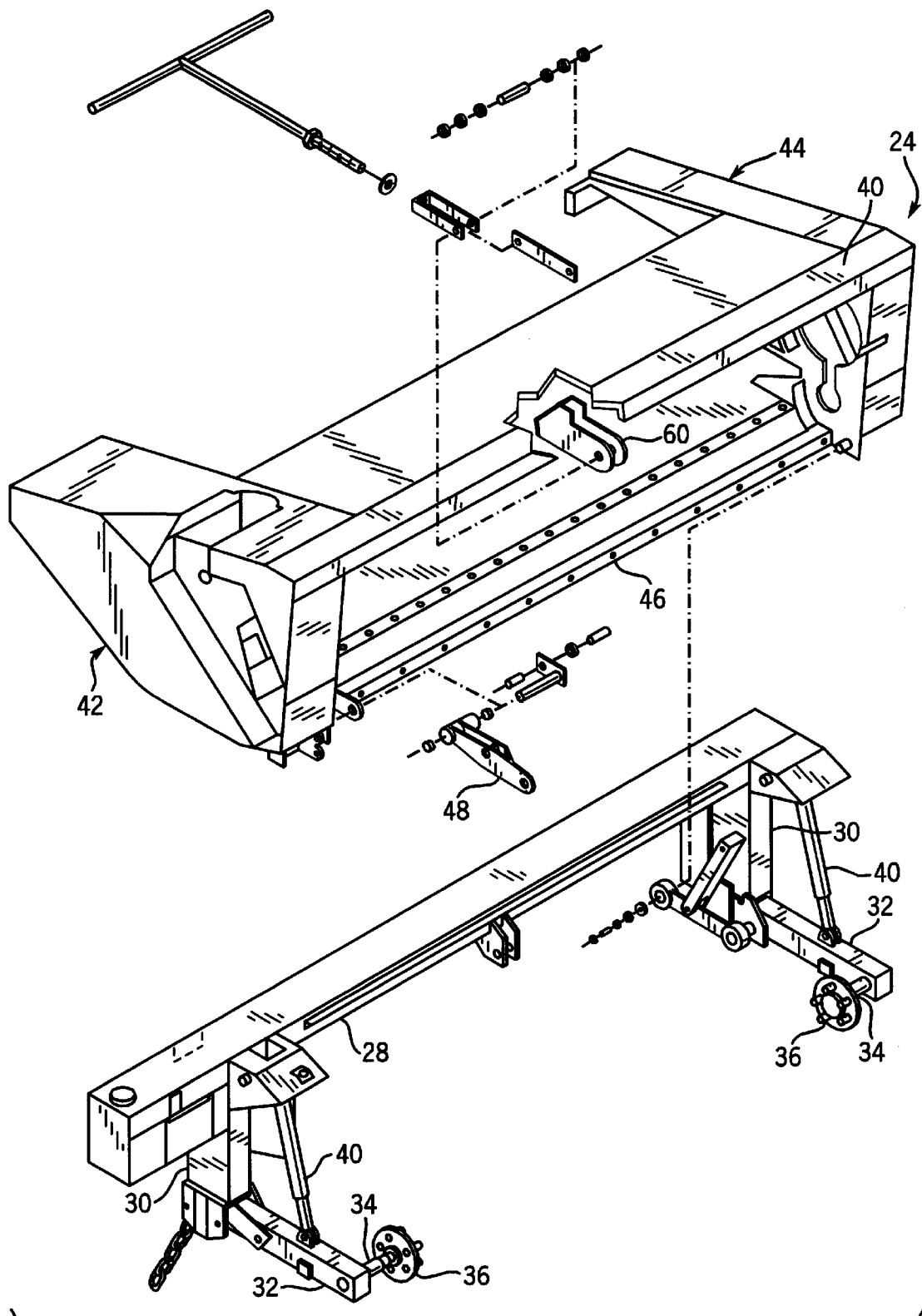
FIG. 2 is an exploded isometric view showing the major subassemblies of the agricultural harvesting machine of FIG. 1, and showing the components of the height adjustment mechanism mounted to the header section of the agricultural harvesting machine.

Referring to FIGS. 1 and 2, frame section 22 includes a transverse upper frame member 28, and a pair of spaced, depending vertical frame members 30 extending downwardly from transverse frame member 28 toward opposite ends defined by transverse frame member 28. Each vertical frame member 30 is connected at its upper end to transverse frame member 28, and an axle support member 32 extends rearwardly from the lower end of each vertical frame member 30. A stub axle 34 is mounted to each axle support member 32 toward its rear end, and a wheel-mounting hub 36 is rotatably supported by each axle 34. A ground-engaging wheel assembly 38 is adapted for mounting to hub 36, in a manner as is known.

Axle support members 32 are pivotably mounted to the lower end of each vertical frame member 30, and hydraulic cylinder 40 is positioned between each axle support member 32 and upper frame member 28.

Header section 24 includes a transverse upper frame member 40 which carries a pair of spaced side housings 42, 44. A cutterbar support member 46 extends between side housings 42 and 44, and is interconnected with a subframe defined by each of side housings 42 and 44. Cutterbar support member 46 supports a conventional crop cutting mechanism, such as a disc-type cutterbar or a sickle-type cutterbar, in a manner as is known. Also as is known, a pair of crop conditioning rolls (not shown) are rotatably supported by side housings 42 and 44 for conditioning crop material cut by the cutting mechanism supported by cutterbar support member 46. A power transmission is contained within side housing 42 for transmitting power to the conditioning rolls and to the cutting mechanism from the driveline supported by tongue 26, in a manner as is known.

Header section 24 is pivotably mounted toward its lower end to vertical frame members 30 of frame section 22. A pair of push arm members, one of which is shown at 48, are each pivotably mounted at a rearward end to one of vertical frame members 30 and at a forward end to one of side housings 42, 44. The pivoting connection of push arm members 48 to header section 24 defines a substantially horizontal pivot axis about which header section 24 is pivotable relative to frame section 22.

An adjustable link arrangement 50, which makes up the header section vertical adjustment mechanism of the present invention, is interposed between header section 24 and frame section 22 at a location spaced vertically above the header section pivot axis defined by push arm members 48.

Figure 3:
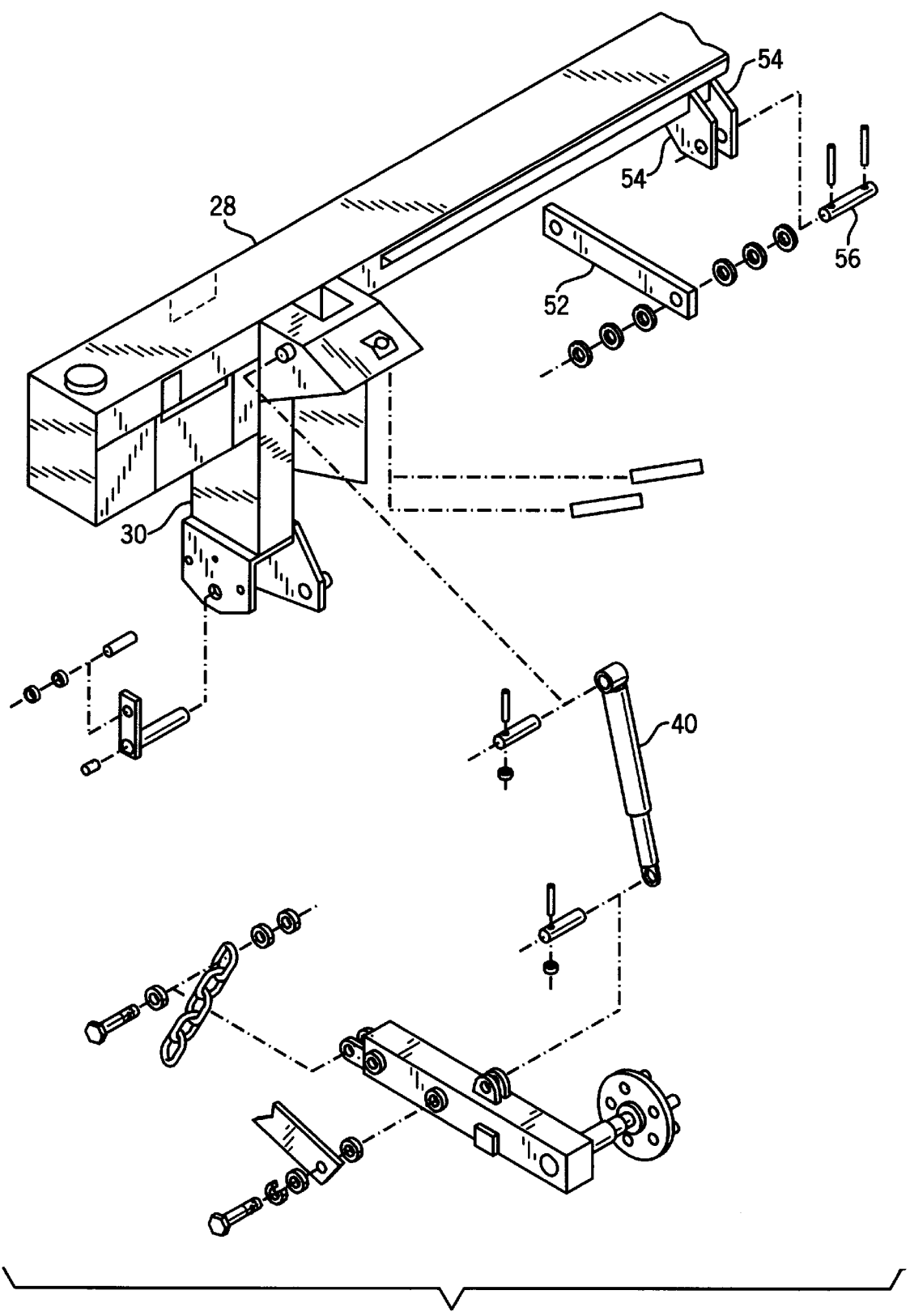
FIG. 3 is an exploded partial isometric view of a portion of the frame of the agricultural harvesting machine of FIG. 1, showing the components of the height adjustment mechanism mounted thereto.
Figure 7:
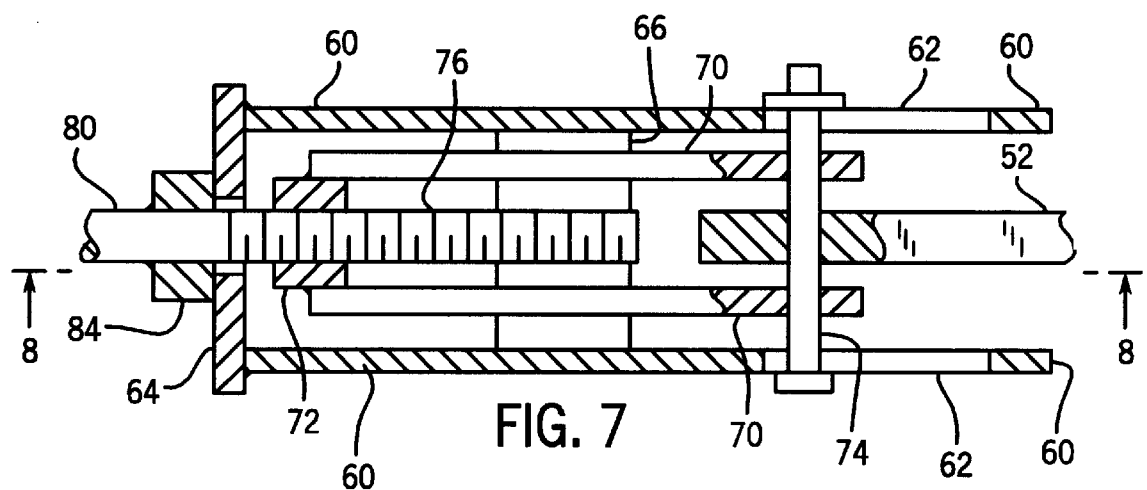
FIG. 7 is a partial top plan view illustrating the assembled components of the height adjustment mechanism in a manner similar to that of FIG. 4.
Figure 8:
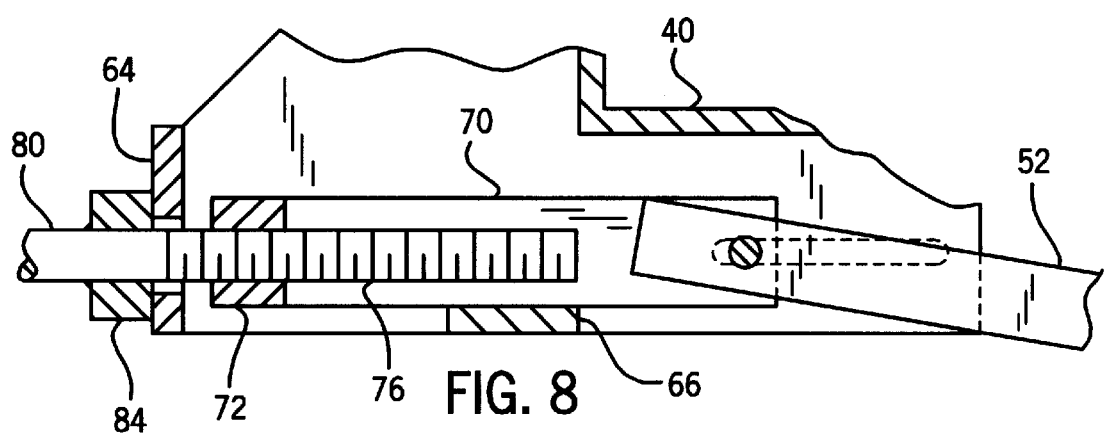
FIG. 8 is a section view taken along line 8—8 of FIG. 7.

Referring to FIG. 3, adjustable link arrangement 50 includes a rear link member 52 which is placed between a pair of mounting ears 54 connected to upper transverse frame member 28 of frame section 22. A pivot pin 56 extends through an opening formed toward the rear end of rear link member 52 and through aligned openings formed in ears 54, for pivotably mounting rear link member 52 to upper transverse frame member 28 through ears 54. The forward end of rear link member 52 is pivotably interconnected with an adjustment assembly, shown generally at 58 (FIG. 4), which is interconnected with header section 24 (FIG. 2) through upper transverse frame member 40.

As shown in FIGS. 2 and 4, adjustment assembly 58 includes a pair of guide members 60 mounted to upper frame member 40 of header section 24. A slot 62 (FIG. 5) is formed in each guide member 60, and a front engagement plate 64 extends between and interconnects the forward ends of guide members 60. A support plate 66 extends between the lower ends of guide members 60.

A front link member, shown generally at 68, is located between guide members 60. Front link member 68 is in the form of a clevis, defined by a pair of spaced side members 70 and an end member 72 connected between the forward ends of side members 70. An opening is formed toward the rear end of each side member 70, and a pivot pin 74 extends through the aligned openings in side members 70 and through an opening formed in the forward end of rear link member 52, so as to connect rear link member 52 and front link member 68 together. In this manner, rear link member 52 and front link member 68 are pivotably interconnected with each other for pivoting movement about a pivot axis defined by pivot pin 74.

Pivot pin 74 defines end sections which are received within slots 62 formed in guide members 60, such that the linkage assembly formed by rear link member 52 and front link member 68 is interconnected with and supported by header section upper frame member 40 through guide members 60. Front link member 68 is also supported by support plate 66 extending between guide members 60.

Adjustment assembly 58 further includes a threaded shaft 76 which is engaged with a threaded passage extending in a front-rear direction through end member 72 of front link member 68. A handle assembly 78 is interconnected with threaded shaft 76. Handle assembly 78 includes an axial portion 80 which extends coaxially with threaded shaft 76, and a transverse portion 82 connected to the forward end of axial portion 80 and extending perpendicularly to axial portion 80. A shoulder 84 is mounted to axial portion 80, and engages front engagement plate 64 which interconnects the forward ends of guide members 60.

Figure 9:
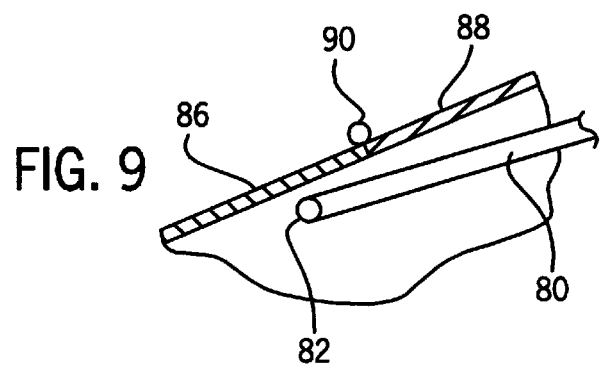
FIG. 9 is a partial section view taken along line 9—9 of FIG. 1, showing the relationship between the height adjustment mechanism handle and the hood of the header section of the agricultural harvesting machine when the hood is in a closed position.
Figure 10:
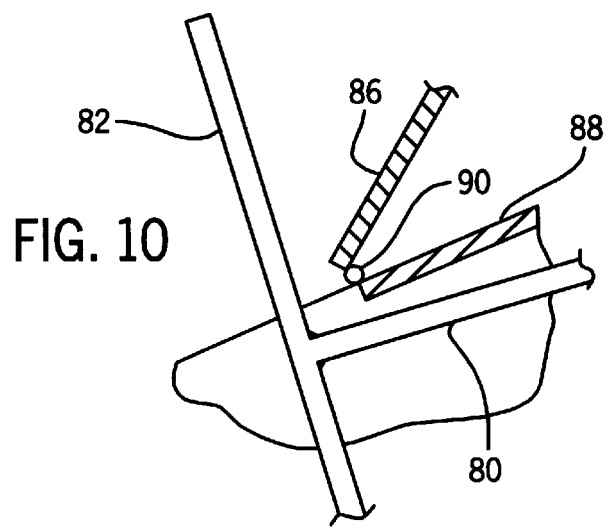
FIG. 10 is a view similar to FIG. 9, showing the relationship between the height adjustment mechanism handle and the hood when the hood is in an open position.

As shown in FIGS. 9 and 10, header section 24 includes a hood 86 pivotably interconnected with a top plate 88 via a hinge 90. Hood 86 is pivotable between a closed position as shown in FIG. 9 and an open position as shown in FIG. 10. In its closed position, hood 86 encloses the cutting mechanism carried by cutterbar support member 46, and also overlies transverse handle portion 82 of adjustment assembly 58. In its open position, hood 86 provides access to the cutting mechanism carried by cutterbar support member 46, as well as to handle transverse portion 82.

In operation, adjustable link arrangement 50 functions as follows to adjust the elevation of the cutting mechanism carried by cutterbar support member 46 of header section 24. FIGS. 4 and 5 illustrate adjustable link arrangement 50 in a position in which header section 24 is fully raised relative to frame section 22 to provide maximum elevation for the cutting mechanism. In this position, pivot pin 74 is in its forwardmost position within slots 62. To lower the cutting mechanism, the user opens hood 86 to gain access to handle transverse portion 82, which also enables the user to view the cutting mechanism carried by cutterbar support member 46 when standing toward the front of mower conditioner 20. The user grasps handle transverse portion 82 and utilizes handle transverse portion 82 to turn handle axial portion 80 and thereby threaded shaft 76 within end member 72 of front link member 68. Since front link member 68 is pinned to rear link member 52 via pivot pin 74, and since rear link member 52 in turn is pinned to upper transverse frame member 28 of frame section 22 through ears 54, the turning of threaded shaft 76 results in forward pivoting movement of header section 24 relative to frame section 22 about the horizontal pivot axis through which header section 24 is interconnected with frame section 22, under the influence of gravity. That is, the turning of threaded shaft 76 allows header section 24 to pivot downwardly and forwardly relative to frame section 22, in a counterclockwise direction with reference to FIG. 1. Header section 24 is engaged with adjustable link arrangement 50 through guide members 60 and front engagement plate 64, which is engaged with shoulder 84 provided on handle axial portion 80. As threaded shaft 76 is turned to lower header section 24, guide members 60 move forwardly and downwardly relative to pivot pin 74, which movement is accommodated by guide slots 62 in guide members 60. The pivoting connection of rear link member 52 to front link member 68 through pivot pin 74 functions to adjust the angle between link member 52 and front link member 68 as header section 24 is moved relative to frame section 22. Similarly, the pivoting connection of rear link member 52 to frame section 22 through pivot pin 56 provides adjustment in the angle of rear link member 52 relative to frame section upper transverse member 28.

As can be appreciated, the ends of guide slots 62 function to limit the range of movement of header section 24 relative to frame section 22, through engagement of pivot pin 74 with the ends of guide slots 62. It can also be appreciated that threaded shaft 76 can be utilized to move header section 24 to virtually any desired position between its fully lowered position and its fully raised position, with the pitch of threads 76 controlling the degree of fineness of the height adjustment accomplished in response to rotation of threaded shaft 76.

Once the desired position of header section 24 is attained, the user positions handle transverse portion 82 in a substantially horizontal orientation so as to enable hood 86 to be closed. When hood 86 is closed in this manner, rotation of handle assembly 78 is prevented by engagement of handle transverse portion 82 with the underside of hood 86.

When header section 24 is placed in any position other than its fully raised position as shown in FIG. 5, adjustable link arrangement 50 accommodates upward and rearward pivoting movement of header section 24 relative to frame section 22, which can occur when cutterbar support member 46 encounters a rock or the like. With reference to FIG. 1, header section 24 is able to pivot in a clockwise direction about the header section pivot axis defined by push arm members 48 as cutterbar support member 46 rides over the rock or other obstruction. When this occurs, header section upper transverse frame member 40 is moved toward frame section upper transverse frame member 28, which movement is enabled by guide slots 62 in guide members 60, within which pivot pin 74 is disposed. Once the rock or other obstruction is cleared, header section 24 is subsequently biased downwardly and forwardly by gravity, and engagement of front engagement plate 64 with shoulder 84 returns header section 24 to its desired position.

Various alternatives and embodiments are contemplated as being within the scope of the following claims particularly pointing out and distinctly claiming the subject matter regarded as the invention.

I claim:

1. An agricultural machine, comprising:

a frame carrying ground-engaging wheels;

a header mounted to the frame and including a crop cutting mechanism, wherein the header is pivotably mounted to the frame for pivoting movement about a transverse pivot axis; and an adjustment mechanism interposed between the header and the frame for adjusting the position of the header relative to the frame, comprising a first link member connected to the frame, a second link member, a pivot connection interposed between the first and second link members defining a link pivot axis substantially parallel to the transverse pivot axis, and an adjustment member engaged with the header and with the second link member, wherein the adjustment member is operable to adjust the position of the header relative to the second link member and to cause pivoting movement between the link members about the link pivot axis to thereby adjust the angle of the header relative to the frame about the transverse pivot axis.

2. The agricultural machine of claim 1, further comprising guide structure engaged with the pivot connection interposed between the first and second link members for guiding axial movement of the header relative to the second link member.

3. The agricultural machine of claim 2, wherein the pivot connection interposed between the first and second link members includes a pin, and wherein the guide structure comprises a guide member having an axial slot within which the pin is received, wherein the slot defines spaced ends and wherein engagement of the pin with the slot ends functions to limit the range of movement of the header relative to the frame.

4. The agricultural machine of claim 2, wherein the adjustment member comprises an axially-extending rotatable threaded member threadedly engaged with the second link member and engaged with the header, wherein turning the threaded member causes movement of the header relative to the second link member.

5. The agricultural machine of claim 4, further comprising a handle connected to the threaded member for use in imparting rotation to the threaded member.

6. An agricultural machine, comprising:

a frame carrying ground-engaging wheels;

a header mounted to the frame and including a crop cutting mechanism, wherein the header is pivotably mounted to the frame for pivoting movement about a substantially horizontal pivot axis; and an adjustment mechanism interposed between the header and the frame for adjusting the position of the header relative to the frame, comprising a first link member connected to the frame, a second link member connected to the first link member, and an adjustment arrangement interconnected between the header and the second link member for adjusting the position of the header relative to the first and second link members to thereby adjust the angle of the header relative to the frame about the pivot axis;

wherein the first and second link members are connected via a pin, and further comprising a guide member having an axial slot within which the pin is received for guiding axial movement of the header relative to the second link member, wherein the slot defines spaced slot ends and wherein engagement of the pin with the slot ends functions to limit the range of movement of the header relative to the frame;

wherein the second link member defines a pair of spaced link ends, wherein the pin is engaged with the first link member and with the second link member toward one of the link ends, and wherein the adjustment arrangement is interconnected with the second link member toward an opposite one of the link ends.

7. The agricultural machine of claim 6, wherein the adjustment arrangement comprises an axially-extending rotatable threaded member threadedly engaged with the second link member and engaged with the header, such that turning the threaded member causes movement of the header relative to the second link member.

8. The agricultural machine of claim 7, wherein the second link member comprises a pair of side members and an end member disposed between the side members and to which the side members are mounted, wherein the threaded member is threadedly engaged within a threaded opening formed in the end member.

9. The agricultural machine of claim 8, further comprising a handle arrangement connected to the threaded member and engaged with the header for imparting rotation to the threaded member.

10. The agricultural machine of claim 9, wherein the handle arrangement is engaged with the header by means of a shoulder provided on the handle arrangement and engageable with a plate member mounted to the header.

11. An agricultural machine, comprising:

a frame carrying ground-engaging wheels;

a header mounted to the frame and including a crop cutting mechanism, wherein the header is pivotably mounted to the frame for pivoting movement about a substantially horizontal pivot axis; and an adjustment mechanism interposed between the header and the frame for adjusting the position of the header relative to the frame, comprising a first link member connected to the frame, a second link member connected to the first link member, and an adjustment arrangement interconnected between the header and the second link member for adjusting the position of the header relative to the first and second link members to thereby adjust the angle of the header relative to the frame about the pivot axis;

wherein the first and second link members are connected via a pin, and further comprising a guide member having an axial slot within which the pin is received for guiding axial movement of the header relative to the second link member, wherein the slot defines spaced slot ends and wherein engagement of the pin with the slot ends functions to limit the range of movement of the header relative to the frame;

wherein the guide member is mounted to the header and includes a pair of spaced guide plates between which the second link member is received, wherein an axial slot is formed in each guide plate for receiving a portion of the pin therein.

12. An agricultural machine, comprising:

a frame carrying ground-engaging wheels;

a header mounted to the frame and including a crop cutting mechanism, wherein the header is pivotably mounted to the frame for pivoting movement about a substantially horizontal pivot axis;

an adjustment mechanism interposed between the header and the frame for adjusting the position of the header relative to the frame, comprising a first link member connected to the frame, a second link member connected to the first link member, and an adjustment arrangement interconnected between the header and the second link member for adjusting the position of the header relative to the first and second link members to thereby adjust the angle of the header relative to the frame about the pivot axis; and guide structure for guiding axial movement of the header relative to the second link member;

wherein the adjustment arrangement comprises an axially-extending rotatable threaded member threadedly engaged with the second link member and engaged with the header, such that turning the threaded member causes movement of the header relative to the second link member, and wherein a handle is connected to the threaded member for use in imparting rotation to the threaded member;

wherein the header includes a hood movable between an open position and a closed position, wherein movement of the hood to its open position provides access to the handle to enable the threaded member to be turned, and wherein the hood in its closed position engages the handle to prevent turning of the threaded member.

13. The agricultural machine of claim 12, wherein the handle comprises an axial portion extending coaxially from the threaded member, and a transverse portion connected to and extending transversely relative to the axial portion, wherein the transverse portion is engageable by a user to turn the threaded member through the axial portion, and wherein the hood engages the transverse portion to prevent rotation of the axial portion when the hood is in its closed position.

14. In an agricultural machine including a pair of sections pivotably interconnected with each other for movement about a transverse pivot axis, wherein one of the sections carries ground-engaging wheels and the other of the sections carries a crop cutting mechanism, the improvement comprising an adjustment arrangement for adjusting the height of the crop cutting mechanism, comprising:

a pair of link members, wherein each link member is mounted to one of the sections and wherein the link members are movably connected to each other; and an adjustment member movably mounted to a first one of the link members and engaged with a first one of the sections, to which the first link member is mounted, wherein the adjustment member is operable to vary the position of the first link member relative to the first section, wherein the link members are oriented and arranged relative to the sections such that adjustment of the position of the first link member relative to the first section causes adjustment in the position of the second link member, which is mounted to a second one of the sections, relative to the first section, to thereby cause relative movement between the first section and the second section about the pivot axis, wherein the first section engages and is supported by the adjustment member and wherein relative movement between the first and second sections is operable to adjust the height of the crop cutting mechanism.

15. The improvement of claim 14, wherein the first and second link members are pivotably interconnected with each other and wherein the second link member is pivotably connected to the second section.

16. The improvement of claim 14, wherein the first and second link members are pivotably interconnected with each other by means of a pivot pin to which each of the first and second link members are pivotably mounted.

17. The improvement of claim 16, further comprising guide structure for guiding movement of the first section relative to the second section in response to operation of the adjustment member, wherein the guide structure comprises a slot arrangement within which the pivot pin is received.

18. The improvement of claim 17, wherein the guide structure comprises a guide member mounted to the first section, wherein the slot arrangement is formed in the guide member.

19. The improvement of claim 14, wherein the adjustment member comprises a rotatable threaded member mounted to the first section and threadedly engaged with the first link member.

20. The improvement of claim 14, wherein the first and second link members are each pivotably connected to a pivot pin for connecting the link members to each other and wherein the adjustment member comprises a threaded member threadedly engaged with the first link member, wherein turning the threaded member relative to the first section results in movement of the first link member relative to the first section, and further comprising guide structure for receiving the pin for guiding movement of the first section relative to the first and second link members upon rotation of the threaded member.

21. In an agricultural machine including a pair of sections pivotably interconnected with each other for movement about a substantially horizontal pivot axis, wherein one of the sections carries ground-engaging wheels and the other of the sections carries a crop cutting mechanism, the improvement comprising an adjustment arrangement for adjusting the height of the crop cutting mechanism, comprising:

a pair of link members, wherein each link member is mounted to one of the sections and wherein the link members are connected to each other; and an adjustment member interconnected between a first one of the link members and a first one of the sections, to which the first link member is mounted, for varying the position of the first link member relative to the first section, wherein the adjustment member comprises a rotatable threaded member mounted to the first section and threadedly engaged with the first link member, and including a handle connected to the threaded member and including an axial portion extending substantially coaxially with the threaded member and a transverse portion adapted for manual engagement by a user to enable rotation of the axial portion and thereby the threaded member, wherein adjustment of the position of the first link member relative to the first section causes adjustment in the position of the second link member, which is mounted to a second one of the sections, relative to the first section, to thereby vary the angle between the first section and the second section about the pivot axis, wherein adjustment in the angle between the first and second sections functions to adjust the height of the crop cutting mechanism.

22. The improvement of claim 21, wherein the first section includes a hood movable between an open position and a closed position, wherein the hood in its open position provides access to the transverse handle portion to enable the threaded member to be rotated, and wherein the hood in its closed position engages the handle transverse portion to prevent the threaded member from being rotated.

23. An adjustment mechanism for adjusting the angle between first and second sections in an agricultural machine, wherein the sections are pivotably interconnected with each other for movement about a transverse pivot axis and wherein the first section carries ground-engaging wheels and the second section carries a cutting mechanism, wherein adjustment of the angle between the sections functions to adjust the elevation of the cutting mechanism, comprising:

a link arrangement connected between the first and second sections at a location spaced from the pivot axis, wherein the link arrangement includes a pair of link members interconnected together via a link pivot connection;

an adjustment member interconnected between one of the sections and one of the link members for adjusting the position of the section relative to the link arrangement to adjust the spacing between the sections at a location spaced from the pivot axis; and guide structure with which the link pivot connection is engaged for guiding movement of the section relative to the link arrangement.

24. The adjustment mechanism of claim 23, wherein a first one of the link members is connected to the first section and wherein the adjustment member is interposed between the second section and a second one of the link members.

25. The adjustment mechanism of claim 24, wherein the adjustment member comprises a threaded member threadedly engaged with the second link member and engaged with the second section, wherein turning of the threaded member results in relative movement between the second link member and the second section.

26. The adjustment mechanism of claim 25, further comprising a handle interconnected with the threaded member for manual engagement by a user to turn the threaded member.

27. In an agricultural machine including a pair of sections pivotably interconnected with each other for movement about a transverse pivot axis, wherein one of the sections carries ground-engaging wheels and the other of the sections carries a crop cutting mechanism, the improvement comprising:

an adjustment mechanism interposed between the first and second sections for adjusting the height of the crop cutting mechanism, wherein the adjustment mechanism includes a rotatable handle having an axial portion and a transverse portion; and a panel provided on one of the sections and movable between an open position and a closed position, wherein movement of the panel to its open position provides access to the transverse portion of the handle to enable the handle to be rotated, and wherein the panel in its closed position engages the transverse portion of the handle to prevent rotation of the handle.

28. The improvement of claim 27, wherein the adjustment mechanism comprises a linkage arrangement interposed between the first and second sections, wherein the handle is engaged with one of the sections and is operable to vary the position of the section relative to the linkage arrangement for varying the position of the first and second sections relative to each other and thereby adjust the height of the crop cutting mechanism.

29. The improvement of claim 27, wherein a first one of the sections comprises a frame carrying the ground-engaging wheels and a second one of the sections comprises a header carrying the crop cutting mechanism, and wherein the movable panel comprises a hood movably mounted to the header.

* * * * *